(12) United States Patent
Jennings et al.

(10) Patent No.: US 6,583,589 B1
(45) Date of Patent: Jun. 24, 2003

(54) HORIZONTAL DRIVE CIRCUIT INCORPORATING AN INTEGRATED BOOST SWITCH-MODE POWER SUPPLY FOR A CRT DISPLAY

(76) Inventors: James R. Jennings, 10604 Riverlake Dr., Knoxville, TN (US) 37922; Steve Stan Golik, 1808 Azrock Dr., Knoxville, TN (US) 37914

( * ) Notice: Subject to any disclaimer, the term of this patent is extended or adjusted under 35 U.S.C. 154(b) by 0 days.

(21) Appl. No.: 10/034,662

(22) Filed: Dec. 28, 2001

(51) Int. Cl.[7] .................................................. H01J 29/70
(52) U.S. Cl. ........................ 315/411; 315/410; 363/20; 363/21
(58) Field of Search ............................. 315/408, 400, 315/410, 411; 363/20, 21, 61

(56) References Cited

U.S. PATENT DOCUMENTS

| | | | | |
|---|---|---|---|---|
| 4,251,756 A | * | 2/1981 | Willis | 315/411 |
| 4,425,611 A | * | 1/1984 | Easter | 363/21 |
| 5,761,057 A | * | 6/1998 | Muchenberger | 363/21 |
| 5,790,389 A | * | 8/1998 | Hua | 363/20 |

* cited by examiner

Primary Examiner—Don Wong
Assistant Examiner—Wilson Lee
(74) Attorney, Agent, or Firm—Edward W. Goodman

(57) ABSTRACT

A horizontal drive circuit employed in CRT displays which uses a switch-mode power supply operating in a boost topology to generate the appropriate supply voltage needed by the horizontal drive circuit is provided. The boost power supply is integrated into the horizontal drive circuit which allows for low printed circuit board area, low cost, and good performance over many different horizontal frequencies.

4 Claims, 2 Drawing Sheets

HORIZONTAL DRIVE CIRCUIT INCORPORATING AN INTEGRATED BOOST SWITCH-MODE POWER SUPPLY FOR A CRT DISPLAY

BACKGROUND OF THE INVENTION

1. Field of the Invention

The present invention relates generally to a horizontal drive circuit for a CRT (cathode ray tube) display, and more particularly, to a horizontal drive circuit which uses a switch-mode power supply operating in a boost topology to generate an appropriate supply voltage needed by the horizontal drive circuit.

2. Background of the Invention

The most commonly used method to provide power to a horizontal drive circuit, with voltage adjustment capability, is to use the RegB+ of the horizontal output stage (usually around 130 VDC) in series with power resistors to reduce the 130 VDC to approximately 65 VDC. FIG. 1 illustrates this conventional horizontal drive circuit 100 which includes capacitor 108, a flyback transformer 112, and a horizontal drive transistor 116 being driven by a horizontal drive IC (integrated circuit) 114. The RegB+ voltage is applied to the circuit 100 at connection 102 and supplies a proper voltage level at connection 110 by reducing the voltage through power resistors 104, 106.

By changing the value of the resistors 104, 106, one can adjust the horizontal drive supply voltage 110. For example, typically two (2) 5W resistors (either placed in series or parallel with a typical equivalent value of 1.5 Kohm to 4.7 Kohm) are used to drop a supply voltage to the horizontal driver circuit to an acceptable/useable voltage. The wattage of the resistors needs to be large enough to handle a fault condition of a shorted driver transistor 116. This method is costly, requires large power resistors (due to fault conditions) which waste printed circuit board (PCB) space, and is not efficient (power is wasted in dropping resistors).

A possible solution would be to have a separate Buck-Boost Switch-mode Supply generating the appropriate horizontal drive voltage which uses its own control IC (integrated circuit) and switching device. However, this solution would require more printed circuit board area and would also have higher costs.

Therefore, a horizontal drive circuit is needed that advantageously combines the separate functions of a boost power supply with a horizontal drive circuit that occupies less printed circuit board area and achieves higher efficiency at lower cost.

SUMMARY OF THE INVENTION

It is therefore an object of the present invention to provide a horizontal drive circuit incorporating a boost switch-mode power supply.

It is another object of the present invention to provide a horizontal drive circuit incorporating a boost switch-mode power supply that occupies less printed circuit board area than the conventional combination of a horizontal drive circuit and associated power supply.

It is a further object of the present invention to provide a horizontal drive circuit incorporating a boost switch-mode power supply that achieves higher efficiency over many different horizontal frequencies.

Another object of the present invention is to provide a horizontal drive circuit incorporating a boost switch-mode power supply that can handle a fault condition of a shorted drive transistor without the use of large power resistors.

To achieve the above objects, a horizontal drive circuit employed in CRT displays which uses a switch-mode power supply operating in a boost topology to generate the appropriate supply voltage needed by the horizontal drive circuit is provided. The boost power supply is integrated into the horizontal drive circuit which allows for low printed circuit board area, low cost, and good performance over many different horizontal frequencies. A means of voltage adjustment and fault protection are also provided.

According to an aspect of the present invention, a horizontal drive circuit includes a flyback transformer having a first end of a primary coil connected in parallel to a capacitor and a second end of the primary coil connected to a horizontal drive transistor, and a boost switch-mode power supply. The boost switch-mode power supply includes an input voltage; a power bus including an inductor for receiving the input voltage and a first diode connected in series; and a switching means connected between the second end of the primary coil and a junction between the inductor and the first diode. Preferably, the switching means takes the form of a second diode. The boost switch-mode power supply further provides a voltage adjustment means through the use of a resistor.

BRIEF DESCRIPTION OF THE DRAWINGS

The above and other objects, features and advantages of the present invention will become more apparent in light of the following detailed description of an exemplary embodiment thereof taken in conjunction with the attached drawings in which.

DETAILED DESCRIPTION OF THE PREFERRED EMBODIMENTS

A preferred embodiment of the present invention will be described hereinbelow with reference to the accompanying drawings. In the following description, well-known functions or constructions are not described in detail to avoid obscuring the invention with unnecessary detail.

This invention comprises the combination of the separate functions of a boost power supply with a horizontal drive circuit. By integrating both functions into one circuit, the advantages of less board space, higher efficiency, lower cost, with adequate fault protection and voltage adjustability are achieved.

Figure 2:
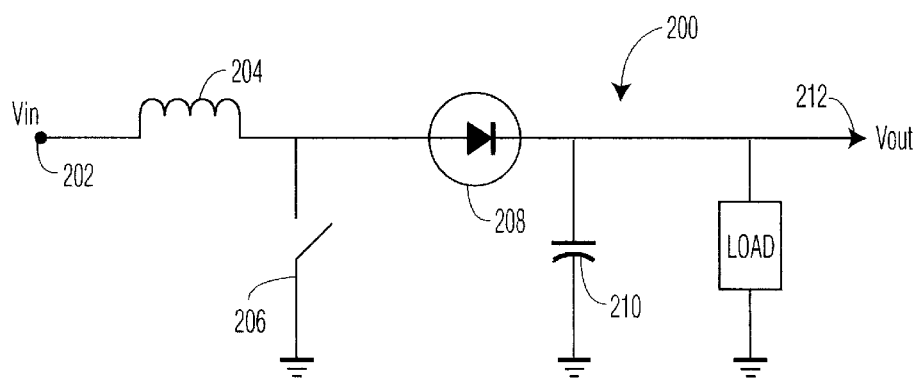
FIG. 2 is a conventional boost circuit for increasing the voltage level of a supply voltage.

FIG. 2 illustrates a schematic diagram of a conventional boost circuit 200. Boost circuit 200 includes a power bus including an inductor 204 connected in series with a diode 208. A switch 206 is connected at a junction of the inductor 204 and the diode 208 and a capacitor 210 is connected at the cathode side of the diode 208 where an output voltage 212 can be measured. The transfer function of boost circuit 200 is determined by the following equation (1):

$$\text{Vout} = \text{Vin}/\text{Duty cycle of switch} \tag{1}$$

Figure 1:
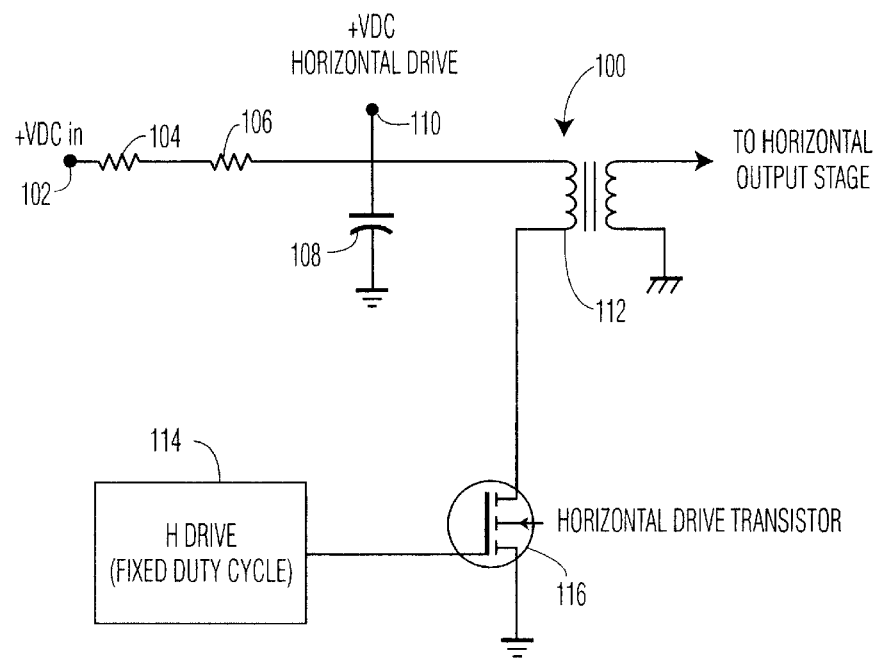
FIG. 1 is a schematic diagram illustrating a conventional horizontal drive circuit.

For example, if switch 206 is operating at a 50% duty cycle, the output voltage, Vout, 212 will equal two times the input voltage, Vin, 202. By incorporating a boost power supply, the horizontal drive circuit becomes much more efficient, since it is not dissipating power through resistors as described above in conjunction with FIG. 1.

Figure 3:
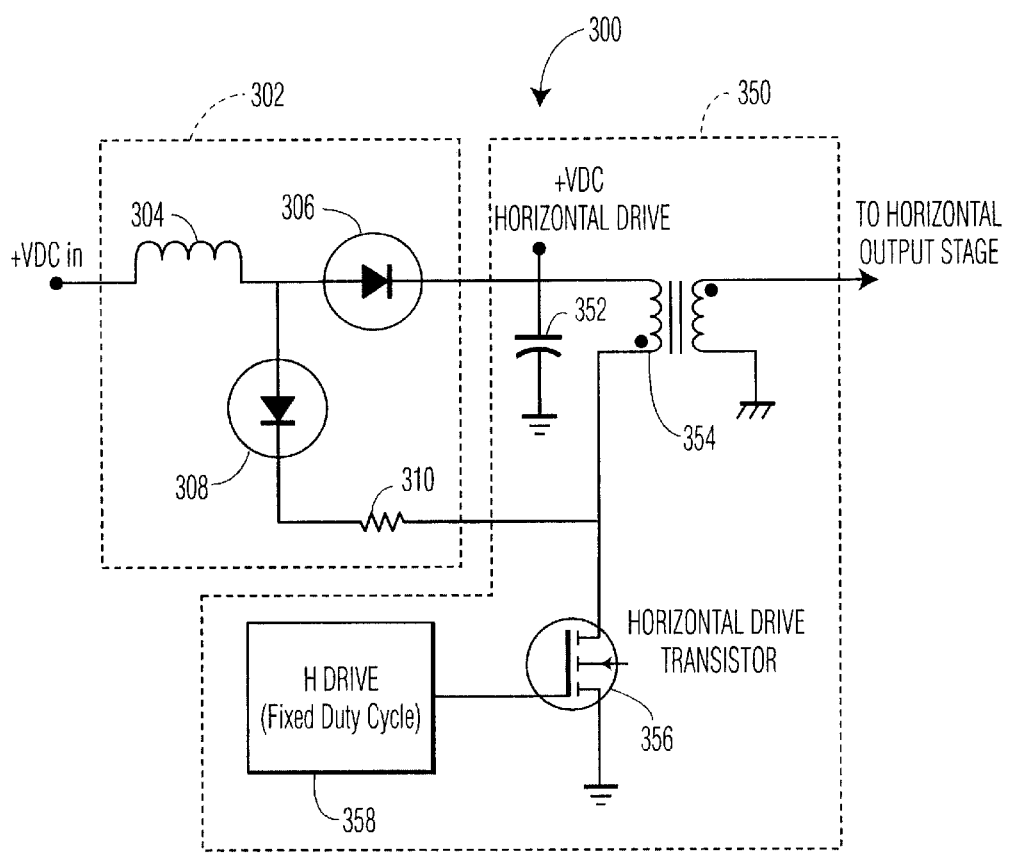
FIG. 3 is a schematic diagram illustrating a horizontal drive circuit incorporating an integrated boost switch-mode power supply in accordance with the present invention.

FIG. 3 is a schematic diagram illustrating a horizontal drive circuit 300 in accordance with the present invention. Referring to FIG. 3, the circuit 300 of the present invention includes a boost power supply circuit 302 and a horizontal drive circuit 350. The boost power supply circuit 302 includes an inductor 304, a first diode 306, a second diode 308 and resistor 310. The horizontal drive circuit 350 includes a capacitor 352, a flyback transformer 354, and a horizontal drive transistor 356 being driven by a horizontal drive IC (integrated circuit) 358. The horizontal drive circuit 350 is configured analogously to the corresponding portion of FIG. 1 described above. The inductor 304 and diode 306 are connected in series with the horizontal drive side of flyback transformer 354, and diode 308 and resistor 310 are connected in series with the opposite end of flyback transformer 354.

As shown in FIG. 3, the switching function accomplished by switch 206 in FIG. 2 is implemented by diode 308. By utilizing diode 308, the horizontal drive circuit 350 of the present invention can advantageously use the horizontal drive pulse, generated by the horizontal drive IC 358, to drive both the boost supply and the horizontal drive transistor 356. This IC 358 is one small part of a signal chain starting from a typical tuner, for example a television tuner. The tuner receives a modulated TV signal from the air and the signal "chain" demodulates the signal and separates the signal into audio, luminance, chroma, and synchronizing components. The horizontal drive signal is generated from the synchronizing component of the input signal and is commonly referred to as horizontal sync. This horizontal sync signal is converted into approximately a 50% duty cycle signal by the signal processor IC and sent to the horizontal drive circuit. This duty cycle can be 40% for some processors and is always fixed in the IC.

Horizontal drive circuit 300 further includes resistor 310 as a means for adjusting the voltage for the horizontal drive voltage. When horizontal drive transistor 356 turns on, it pulls current through inductor 304, diode 308 and resistor 310. A voltage develops across resistor 310 due to this current. This voltage reduces the current by reducing the forcing voltage across inductor 304. Due to volt second balance across inductor 304 (since an ideal inductor cannot have DC voltage across it), the voltage developed across resistor 310 reduces the "flyback" voltage at the anode of diode 306 when the horizontal drive transistor 356 is turned off. This, in turn, reduces the boost horizontal drive voltage seen at the cathode of diode 306 thereby allowing a means of adjustment. The larger the value of resistor 310 the smaller horizontal drive voltage. For example, the maximum horizontal drive voltage would be approximately two times +35 VDC or 70 VDC. The minimum horizontal drive voltage with resistor 310 open would equal +35 VDC. By adjusting resistor 310, a horizontal drive voltage between 70 VDC and 35 VDC can be achieved. Of course, the more the horizontal drive voltage is reduced, the more power is dissipated in resistor 310. Therefore, a practical adjustment range is 10% to keep the resistor 310 below ½ Watt.

The horizontal drive circuit of the present invention provides for better fault protection. If the horizontal drive transistor 356 shorts, then diode 306 is pulled to ground. If the inductor's 304 resistance is kept to a minimum (about 2 Ohms), then resistor 310 will now see +35 VDC across it. Since Power=V2/R, resistor 310 will see 10 Watts, assuming resistor 310 is at a maximum value of 120 Ohms. If resistor 310 becomes a fusible resistor, then it will open safely without exceeding design temperature guidelines of 95° C., at what point the solder securing the resistor would become molten.

Since the horizontal drive circuit 300 operates on a "duty cycle" basis, it is very tolerant to horizontal drive frequency changes. This is important due to the many TV standards currently employed. This means the horizontal drive frequency can vary between one to three times the frequency with insignificant change to the horizontal drive voltage because the duty cycle voltage stays the same.

Constraints

Inductor 304 must be high enough in inductance to keep the current continuous. If the current goes discontinuous, then ringing will occur on the drive waveform and also the supply voltage will increase. This is due to the effective duty cycle changing due to the discontinuous current operation. Therefore, the inductance value would be set using the input DC voltage and the minimum operating frequency.

While the present invention has been described in detail with reference to the preferred embodiments, they represent mere exemplary applications. Further, the invention can find use in other applications and/or devices besides CRT displays. Thus, it is to be clearly understood that many variations can be made by anyone having ordinary skill in the art while staying within the scope and spirit of the present invention as defined by the appended claims.

What is claimed is:

1. A horizontal drive circuit including a flyback transformer having a first end of a primary coil connected in parallel to a capacitor and a second end of the primary coil connected to a horizontal drive transistor, comprising:
    a boost switch-mode power supply, said boost switch-mode power supply comprising:
        an input voltage;
        a power bus including an inductor for receiving the input voltage and a diode connected in series; and
        a switching means connected between the second end of the primary coil and a junction between the inductor and the diode, wherein said switching means is a diode.

2. A horizontal drive circuit including a flyback transformer having a first end of a primary coil connected in parallel to a capacitor and a second end of the primary coil connected to a horizontal drive transistor, comprising:
    a boost switch-mode power supply, said boost switch-mode power supply comprising:
        an input voltage;
        a power bus including an inductor for receiving the input voltage and a diode connected in series;
        a switching means connected between the second end of the primary coil and a junction between the inductor and the diode; and
        voltage adjustment means, wherein the voltage adjustment means is a resistor.

3. A method for driving a horizontal drive circuit comprising the steps of:
    providing a horizontal drive circuit including a flyback transformer having a first end of a primary coil connected in parallel to a capacitor and a second end of the primary coil connected to a horizontal drive transistor; and
    providing a boost switch-mode power supply for supplying a voltage to the horizontal drive circuit,
    wherein the boost switch-mode power supply comprises:

an input voltage;

a power bus including an inductor for receiving the input voltage and a diode connected in series; and a switching means connected between the second end of the primary coil and a junction between the inductor and the diode, and wherein said switching means is a diode.

4. A method for driving a horizontal drive circuit comprising the steps of:

providing a horizontal drive circuit including a flyback transformer having a first end of a primary coil connected in parallel to a capacitor and a second end of the primary coil connected to a horizontal drive transistor; and providing a boost switch-mode power supply for supplying a voltage to the horizontal drive circuit, wherein the boost switch-mode power supply comprises:
an input voltage;

a power bus including an inductor for receiving the input voltage and a diode connected in series;

a switching means connected between the second end of the primary coil and a junction between the inductor and the diode; and voltage adjustment means, wherein the voltage adjustment means is a resistor.

* * * * *

UNITED STATES PATENT AND TRADEMARK OFFICE
CERTIFICATE OF CORRECTION

PATENT NO. : 6,583,589 B1
DATED : June 24, 2003
INVENTOR(S) : James R. Jennings and Steve Golik It is certified that error appears in the above-identified patent and that said Letters Patent is hereby corrected as shown below:

<u>Title page,</u>
Insert -- [73] Assignee: Koninklijke Philips Electronics N.V., Eindhoven (NL) --.

Signed and Sealed this

Second Day of September, 2003

JAMES E. ROGAN
*Director of the United States Patent and Trademark Office*